(12) United States Patent
Kulyk

(10) Patent No.: US 11,905,111 B1
(45) Date of Patent: Feb. 20, 2024

(54) WASTE MANAGEMENT AND SORTING SYSTEMS AND METHODS

(71) Applicant: Stanislav Kulyk, Lublin (PL)

(72) Inventor: Stanislav Kulyk, Lublin (PL)

( * ) Notice: Subject to any disclaimer, the term of this patent is extended or adjusted under 35 U.S.C. 154(b) by 0 days.

(21) Appl. No.: 18/171,348

(22) Filed: Feb. 18, 2023

(51) Int. Cl.
*B65F 1/14* (2006.01)

(52) U.S. Cl.
CPC ...... *B65F 1/1484* (2013.01); *B65F 2210/108* (2013.01); *B65F 2210/128* (2013.01); *B65F 2210/168* (2013.01); *B65F 2210/176* (2013.01)

(58) Field of Classification Search
CPC .............. B65F 2001/008; B65F 1/484; B65F 2210/018; B65F 2210/128; B65F 2210/168; B65F 2210/176; G07F 7/0609
See application file for complete search history.

(56) References Cited

U.S. PATENT DOCUMENTS

| | | | | |
|---|---|---|---|---|
| 4,579,216 A | * | 4/1986 | DeWoolfson | G07F 7/0609 100/902 |
| 5,423,492 A | * | 6/1995 | Willis | B02C 19/0087 209/919 |
| 8,718,818 B2 | * | 5/2014 | Nordbryhn | G07F 7/0609 700/240 |
| 10,977,622 B2 | * | 4/2021 | Borowski | G06Q 90/00 |
| 2005/0209825 A1 | * | 9/2005 | Ogawa | B65F 9/00 702/188 |
| 2010/0217715 A1 | * | 8/2010 | Lipcon | G06Q 10/00 705/308 |
| 2012/0173014 A1 | * | 7/2012 | Morishita | B28B 3/02 700/223 |
| 2012/0209783 A1 | * | 8/2012 | Smith, Jr. | G06Q 20/384 705/308 |
| 2014/0122347 A1 | * | 5/2014 | Moran | G06Q 10/30 705/308 |
| 2014/0202116 A1 | * | 7/2014 | Bell | B65F 1/06 53/425 |
| 2015/0324760 A1 | * | 11/2015 | Borowski | B65F 1/0006 705/308 |
| 2018/0268379 A1 | * | 9/2018 | Collins | G06Q 10/0838 |
| 2019/0392403 A1 | * | 12/2019 | Rainaldi | G06Q 30/0215 |

* cited by examiner

*Primary Examiner* — Joseph C Rodriguez
(74) *Attorney, Agent, or Firm* — Vladimir Postnikov

(57) ABSTRACT

Devices, systems, and methods of garbage sorting and processing to encourage proper waste disposal are disclosed. An embodiments of the waste management and sorting system comprises a smart waste machine configured to receive waste from a user and place the waste in proper storage containers having first identifiers, a mobile application configured to run on a user device and communicatively coupled to the smart waste machine and/or the server device, and a conveyor system configured to sort and/or process waste once it is removed from the storage containers.

9 Claims, 5 Drawing Sheets

WASTE MANAGEMENT AND SORTING SYSTEMS AND METHODS

TECHNICAL FIELD

The present disclosure relates generally to devices, system, and methods of waste management. More specifically, the present disclosure related to devices, systems, and methods of garbage sorting and processing to encourage proper waste disposal.

BACKGROUND OF THE INVENTION

As human consumption of goods continues to grow yearly, so does the total waste produced by consuming said goods. Much of the total waste is avoidable with proper recycling and waste management. Many modern waste sorting facilities are unable to effectively and efficiently sort incoming mixed trash, especially those located in large urban environments. Therefore, citizens of such environments that live in residential complexes currently need to spend significant time and effort to presort their waste for processing. In some states, the system of garbage presorting is limited to a few open waste receptacles, each of which is intended for a distinct waste group such as glass, paper, food, plastic, etc. Similarly, proper use of such receptacles requires each citizen to spent their time and effort to presort their waste.

The primary impediment for proper sorting is an indiscipline of residents resulting from ignorance of waste segregation rules. This leads to the aforementioned inefficiency of presorting. Many garbage collection service providers impose fines and have high fees for residential complexes that have unsorted waste collected in dumpsters. Such imposed costs are unfair in terms of individualism, as those who properly presort their waste are as equally responsible for paying said costs as those who do not properly presort. Similarly, citizens that pay the same fixed fee for waste collection and processing are negatively impacted from an individualism standpoint as those that have larger consumption demands and produce more waste as a result should pay more than those who produce less waste.

Moreover, if illegal or suspicious items are found in collective waste piles or in a waste sorting line, it's often very difficult if not impossible to determine who the items belonged to.

BRIEF SUMMARY OF THE INVENTION

The present disclosure provides devices, systems, and methods of garbage sorting and processing to encourage proper waste disposal.

A first embodiment comprises a server having a memory storing a database and one or more processors, a smart waste machine comprising a housing, a selectively openable hatch, a user identification device, a first computer communicatively coupled to the user identification device and the server device, the computer having a user facing interface, a memory, and one or more processors.

The one or more processors of the first computer are configured to identify a user, collect waste type data from the user, determine and prepare a storage container configured to contain the user's waste, the storage container having a first identifier, selectively open and close the hatch, close the storage container, and send a plurality of data corresponding to the first identifier to the server device so that the server device updates the database to reflect the disposal of the waste.

In some embodiments, the first identifier is a near-field communication ("NFC") chip, radio frequency identification ("RFID") chip, quick response ("QR") code, or barcode.

In some embodiments, the user is identified based on data captured by the user identification device.

In some embodiments, the user is identified based on the data input by the user using the user facing interface.

In some embodiments, the waste type data and user identity data are collected through a user device communicatively coupled to the server device and/or the smart waste machine.

In practice, after the aforementioned embodiments are utilized to dispose waste, closed storage containers having first identifiers would be transported to sorting or processing facilities by various businesses or entities.

A second embodiment comprises the elements of the first preferred embodiment and a first identifier sensor, one or more conveyor belts, one or more optical sensors, and a second computer having a memory and one or more processors, the processors being communicatively coupled to the server device, the identification sensor, and the one or more optical sensors.

The one or more processors of the second computer are configured to determine the type of waste in a storage container based on captured first identifier data, and, once the waste has been removed from the storage container and selectively placed on the proper conveyor belt, to detect wrongly sorted waste based on captured waste data. In response to detecting wrongly sorted waste, the wrongly sorted waste is removed and/or human workers are signaled to remove the wrongly sorted waste manually and a plurality of data corresponding to the wrongly sorted waste is sent to the server device so that the server device updates the database to reflect the user's disposal of wrongly sorted waste.

In some embodiments, the detection of wrongly sorted waste results in the accrual of a surcharge payment associated with the disposer of the waste in the database.

In some embodiments, the second preferred embodiment further comprises one or more video cameras configured to capture and store visual data associated with the waste as it travels on the conveyor belt.

In some embodiments, the removal of waste from storage containers, the selective placement of the removed waste onto a conveyor belt, the detection of wrongly sorted waste, the removal of wrongly sorted waste, and the sending of data corresponding to the detection of wrongly sorted waste is performed by human workers.

In some embodiments, the one or more processors of the second computer are further configured to remove the waste from the storage container and selectively place the removed waste onto the proper conveyor belt.

BRIEF DESCRIPTION OF THE DRAWINGS

This invention will be better understood with reference to the following figures which are intended to illustrate specific embodiments within the overall scope of the invention as claimed:

DETAILED DESCRIPTION

In the following description, to better understand the aforementioned purposes, features, and advantages of the present invention, numerous specific details are set forth in order to provide a thorough understanding of the subject matter. It should be noted that these details and examples are provided to merely aid in understanding the descriptions, and they do not, in any way, limit the scope of the present invention. The present invention can also be implemented in other modes different from those described herein and the present invention is not limited to the specific embodiments disclosed below.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing implementation of the various embodiments described herein.

Embodiments described herein provide for devices, systems, and methods of garbage sorting and processing to encourage proper waste disposal.

Figure 1:
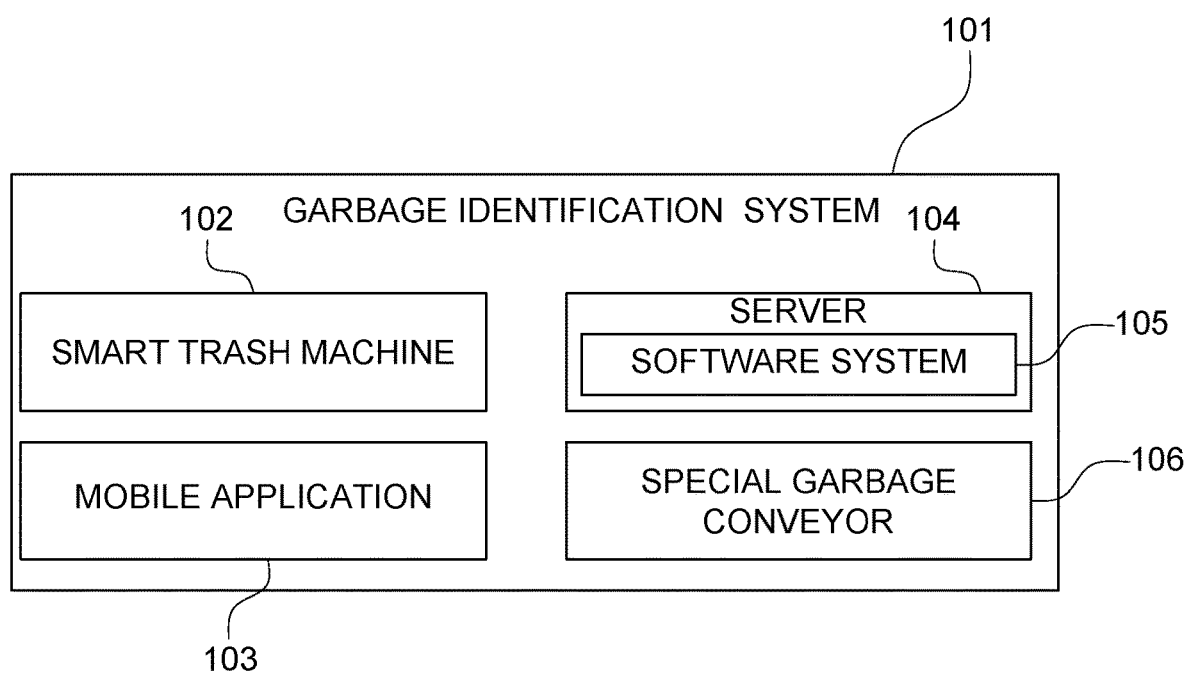
FIG. 1 is a block diagram showing a waste management and sorting system according to an embodiment of the present invention.

FIG. 1 illustrates a block diagram showing a waste management and sorting system 101 according to an embodiment of the present invention. The system 101 comprises a smart waste machine 102, a mobile application configured to run on a user device and communicatively coupled to a server device 104 having a memory and one or more processors, the memory storing a database and the one or more processors configured to run software 105, and a conveyor system 106.

Figure 2:
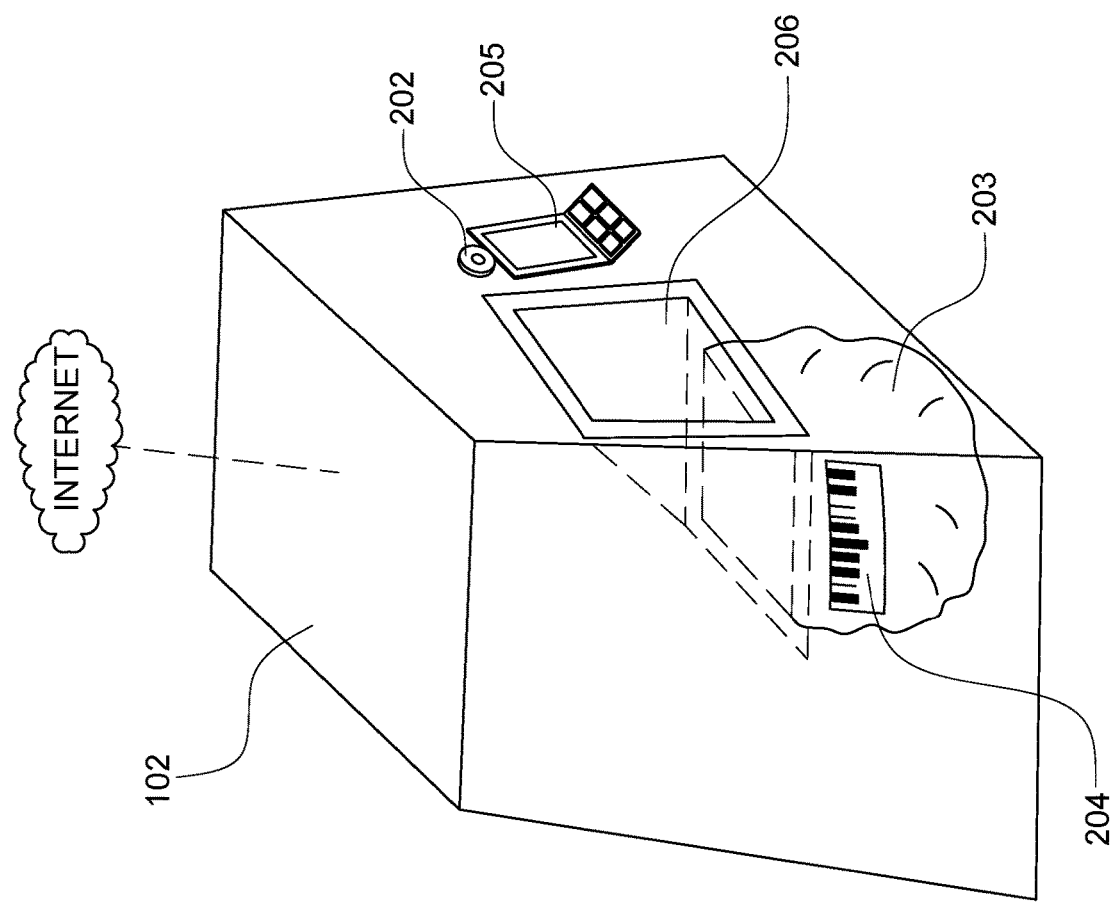
FIG. 2 is a perspective view of a smart waste machine system used by the waste management and sorting system of FIG. 1.

FIG. 2 illustrates a perspective view of a smart waste machine system used by the waste management and sorting system of FIG. 1 comprising a housing 102, a selectively openable hatch on the exterior of the housing 206, a user identification device on the exterior of the housing 202, an internal mechanism (not shown) configured to prepare storage containers to receive waste and to move/prepare full storage containers to be transported, and a first computer 205, communicatively coupled to the user identification device 202 and the server device 104 via the internet or other network. The first computer 205 has a user facing interface, a memory, and one or more processors configured to identify a user, collect waste type data from the user corresponding to a waste to be disposed, determine and prepare a storage container 203 having a first identifier 204 associated with the storage container 203, close the hatch 206, close the storage container 203, and send a plurality of data corresponding to the first identifier to the server device 104 so that the server device updates the database to reflect the disposal of the waste.

The smart waste machine is configured with the internal mechanism components necessary to prepare the required storage containers 203 and their corresponding first identifiers 204.

The first identifier can be, without limitation, a near-field communication ("NFC") chip, radio frequency identification ("RFID") chip, quick response ("QR") code, or barcode.

In some embodiments, the user is identified based on data captured by the user identification device 202.

In some embodiments, the user is identified based on the data input by the user using the user facing interface of the first computer 205.

In some embodiments, the smart waste machine further comprises internal sensors that prevent the user from inserting more waste once the provided storage container has reached its maximum capacity.

In some embodiments, the waste type data and the user identity data are collected through a user device communicatively coupled to the server device 104 and/or the smart waste machine. In some embodiments, the user device is communicatively coupled to the server device 104 and/or the smart waste machine using a mobile application 103.

Figure 3:
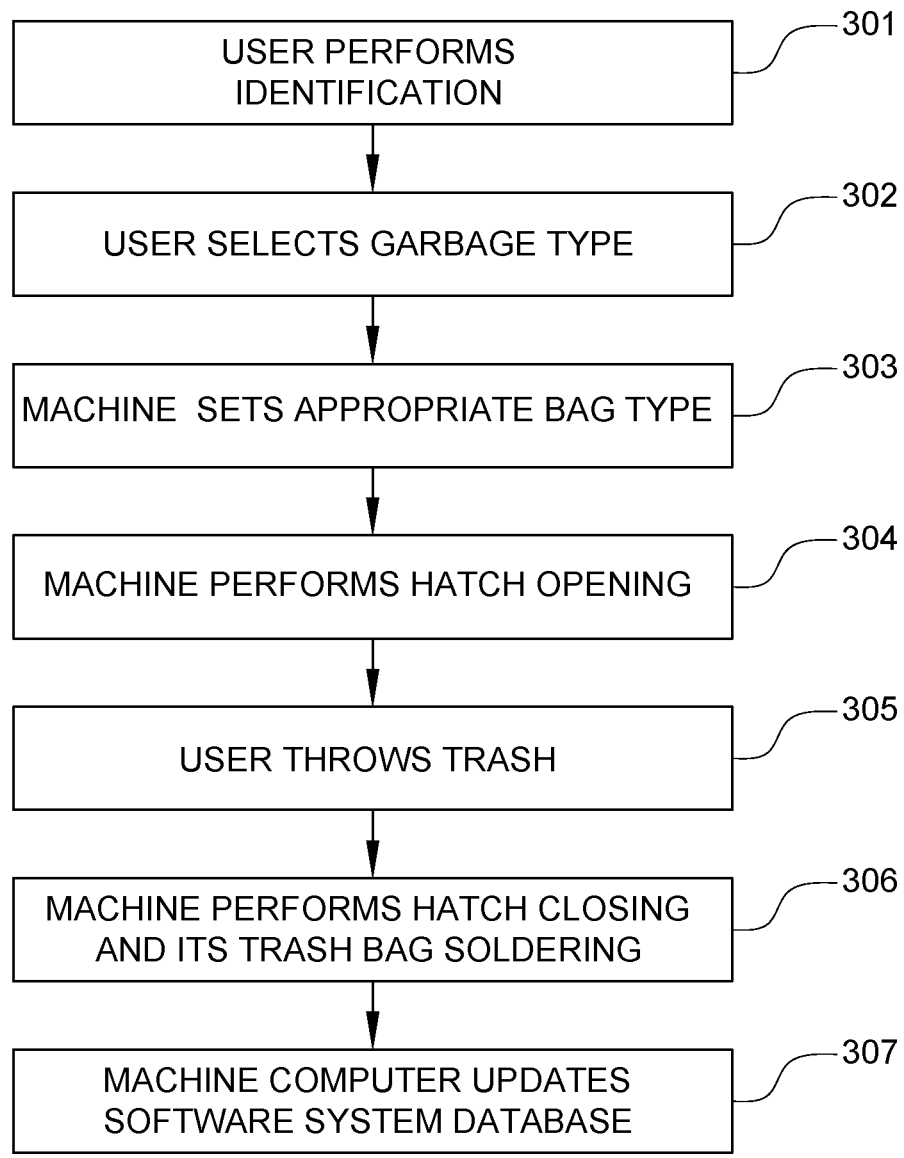
FIG. 3 is a block diagram showing the method to use the smart waste machine of FIG. 2 according to an embodiment of the present invention.

FIG. 3 illustrates a block diagram showing the method to use the smart waste machine of FIG. 2 according to an embodiment of the present invention. At step 301, the user utilizing the smart waste machine is identified. As previously mentioned, the user identification data can be collected using the user identification device 202, the user facing interface, or by the user providing information to the application on their user device. At step 302, waste type data corresponding to the type of waste to be disposed is collected from the user. The waste type data can be collected using any of the aforementioned data collection methods. At step 303, the proper storage container to contain the waste and its corresponding first identifier is determined and prepared by the system for the user to insert their waste into. Once preparation of the storage container is complete, at step 304, the hatch is opened and the user inserts their waste into the prepared storage container 305. At step 306, the hatch is closed and the storage container is closed. At step 307, the first computer sends a plurality of data corresponding to the first identifier to the server device so that the server device updates the database to reflect the disposal of the waste.

In some embodiments, the plurality of data corresponding to the first identifier includes, without limitation, the sequential number of the storage container, the identity of the user, the time of waste disposal, the waste type of the waste, and the weight of the waste.

In some embodiments, the storage containers are disposable garbage bags and the garbage bags are closed by soldering the open portion of the bags.

In practice, after the aforementioned embodiments of the smart waste machine are utilized to dispose waste, closed storage containers having first identifiers are then transported to sorting or processing facilities by various businesses or entities.

Figure 4:
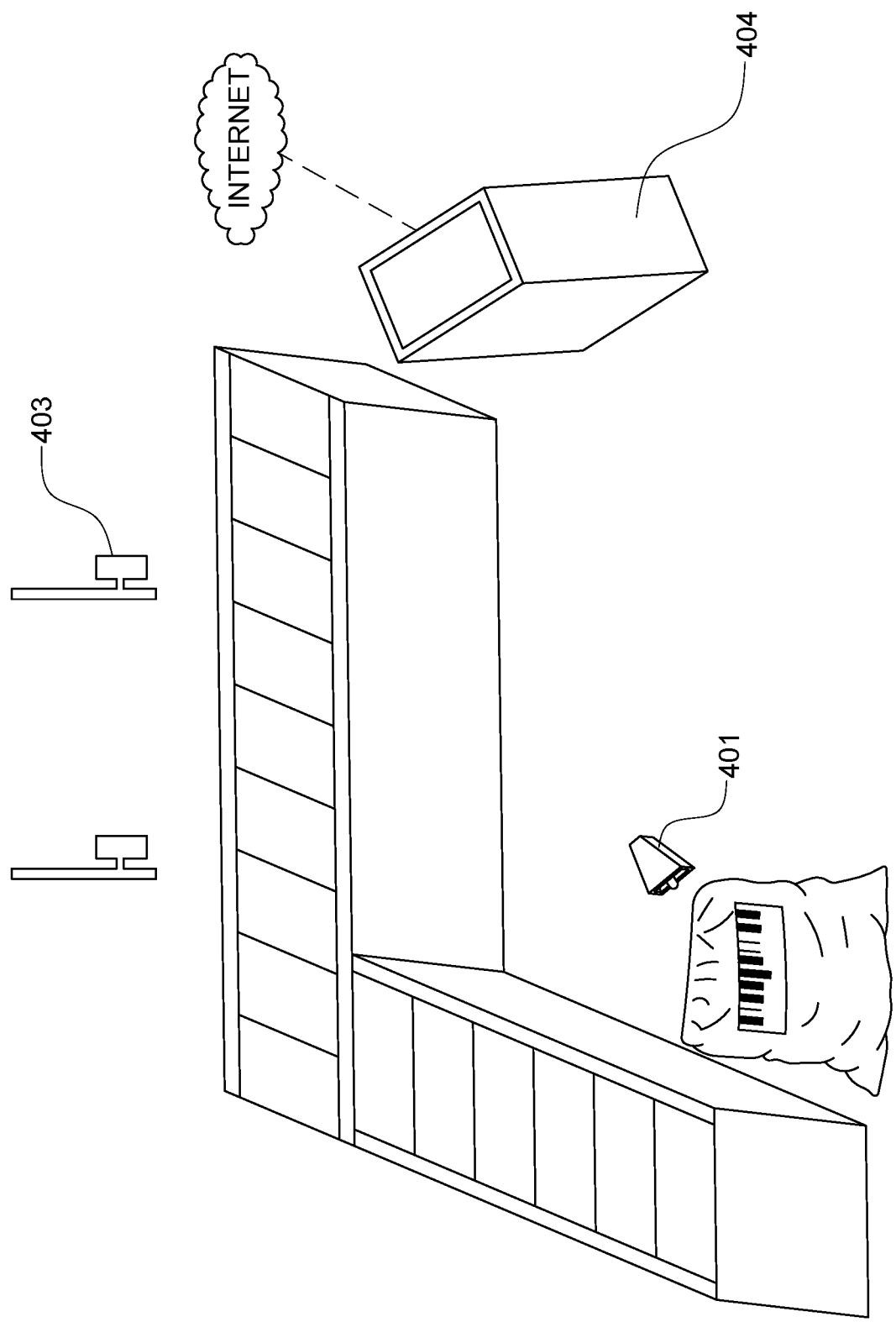
FIG. 4 is a perspective view of a conveyor belt system used by a waste management and sorting system in conjunction with the smart waste machine system of FIG. 2 according to an embodiment of the present invention; and, FIG. 5 is a block diagram showing the method of using the conveyor belt system of FIG. 4 according to an embodiment of the present invention.

FIG. 4 illustrates a perspective view of a conveyor belt system used by the waste management and sorting system of FIG. 1 in conjunction with the smart waste machine system of FIG. 2 according to an embodiment of the present invention. The conveyor belt system comprises a first identifier sensor 401 configured to capture first identifier data associated with the first identifier of a received storage container, one or more conveyor belts configured to move waste removed from a waste storage container, one or more optical sensors 403 configured to capture a plurality of waste data associated with the waste, and a second computer 404 having a memory and one or more processors. The one or more processors are communicatively coupled to the server device 105, the identification sensor 401, the one or more conveyor belts, and the one or more optical sensors 403. The one or more processors are configured to determine the type of waste in a storage container based on captured first identifier data from the identification sensor 401, and, once the waste is removed from the storage container and selectively placed on the proper conveyor belt, to detect wrongly sorted waste based on visual data analytics of the captured waste data (e.g., recognizing that items of waste on the conveyor belt that have been visually analyzed are not of the waste type associated with the first identifier). In response to detecting wrongly sorted waste, the one or more processors are configured to remove the wrongly sorted waste and/or signal human workers to remove the wrongly sorted waste and to send a plurality of data corresponding to the wrongly sorted waste to the server device 105 so that the server device updates the database to reflect the user's disposal of wrongly sorted waste.

The first identifier sensor 401, the one or more conveyor belts, and the one or more optical sensors 403, can each be communicatively coupled to the second computer 404 and/or the server device 105, via the internet or other network.

In some embodiments, the conveyor system further comprises one or more video cameras configured to capture and store visual data associated with the waste as it travels on the conveyor belt.

In some embodiments, the detection of wrongly sorted waste results in an accrual of a surcharge payment associated with the disposer of the waste in the database. For example, and without limitation, a user account corresponding to a user that selected a plastic waste type, but deposited a metal item in the storage container selected for plastic waste types only would flagged by the second computer once the metal item was detected as wrongly sorted by the conveyor system. The database of the server device would be updated to reflect that a surcharge has accrued for the user account.

In some embodiments, the detection of wrongly sorted waste, removal of wrongly sorted waste, and the sending of data corresponding to the detection of wrongly sorted waste is performed by human workers.

In some embodiments, once a first identifier corresponding to a storage container is scanned, the waste in the storage container is selectively transported onto a conveyor belt system by human workers. In other embodiments, the conveyor system further comprises a means of storage container transportation and emptying such as robotic arms or the like.

Figure 5:
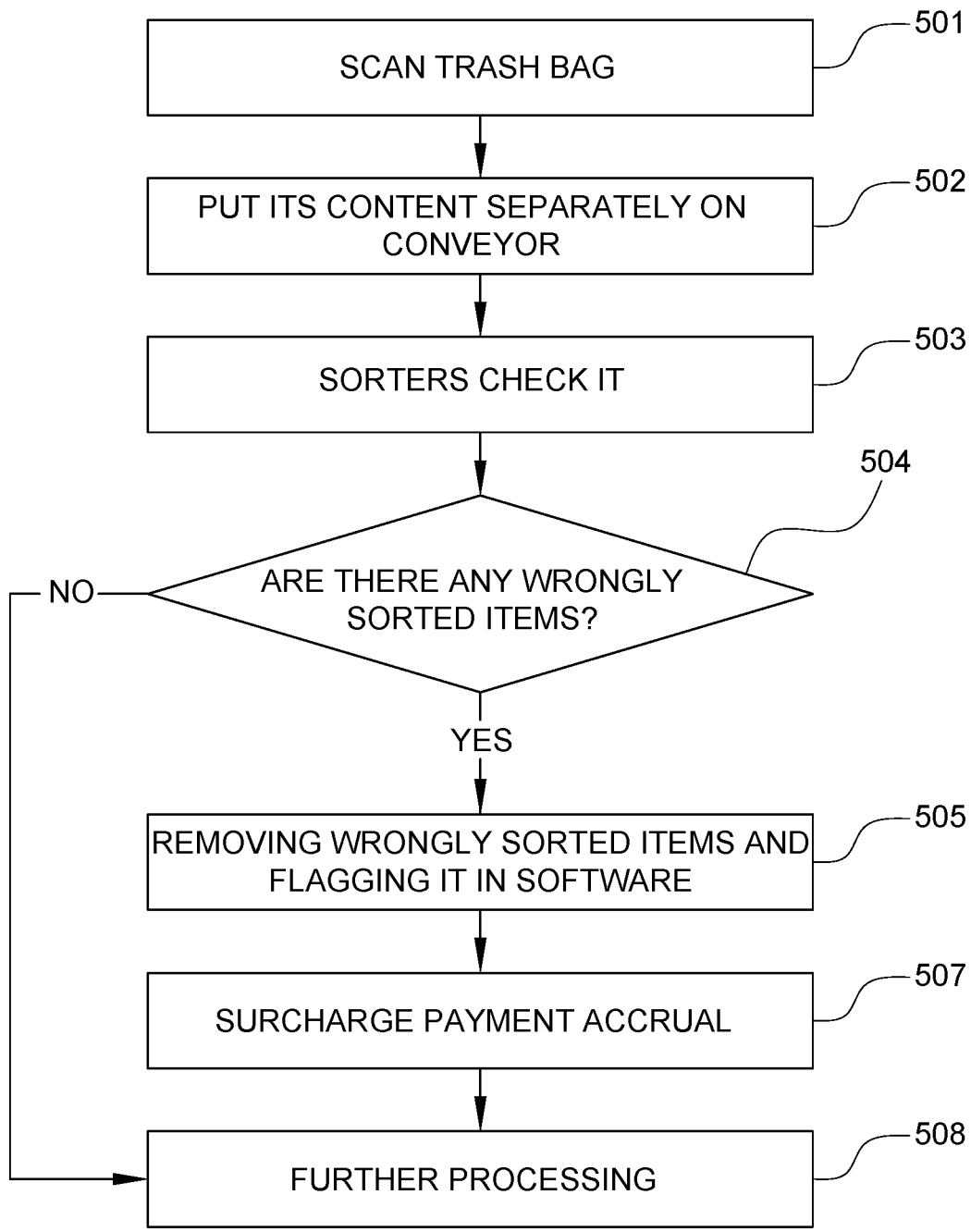

FIG. 5 illustrates a block diagram showing the method of using the conveyor belt system of FIG. 4 according to an embodiment of the present invention. At step 501, the first identifier on a received storage container is scanned by the first identifier sensor 401 to obtain first identifier data. The database of the server device 105 is then queried to return a plurality of data associated with the storage container and its contents based on the first identifier data. At step 502, once waste is removed from the storage container and selectively placed on the proper conveyor belt, wrongly sorted waste is detected based on waste data captured by the one or more optical sensors 403 or by human workers tasked with sorting. At step 504, if there are no wrongly sorted items in the waste, the waste is transported by the one or more conveyor belts for further processing. If there are wrongly sorted items, the wrongly sorted items are removed either by mechanical means or human effort 505. Furthermore, a plurality of data corresponding to the wrongly sorted waste is sent to the server device 105 from the second computer 404 to cause the server device to update the database to reflect the user's disposal of wrongly sorted waste. At step 507, the detection of wrongly sorted waste results in the accrual of a surcharge payment for the user that deposited the wrongly sorted waste.

In some embodiments, the detection of wrongly sorted waste is performed by one or more human workers.

In some embodiments, rather than a user receiving a surcharge for disposing of wrongly sorted waste, a reward system is used.

In some embodiments, the user has an option to declare their waste type as mixed when disposing of their waste using the smart waste machine. In some embodiments, a higher fee for disposal can automatically apply for mixed waste disposal.

Preferably, the conveyor system processes/sorts the waste of a singular storage container at a time. In some embodiments that utilize a plurality of conveyor belts, multiple storage containers can be processed/sorted at a time.

The number and arrangement of components shown in FIG. 1, FIG. 2, and FIG. 4 are provided as an example. In practice, the systems disclosed herein may include additional components, fewer components, different components, or differently arranged components than those shown in FIG. 1, FIG. 2, and FIG. 4. Additionally, or alternatively, a set of components (e.g., one or more components) of the systems disclosed herein may perform one or more functions described as being performed by another set of components of the systems.

The foregoing disclosure provides illustration and description, but is not intended to be exhaustive or to limit the implementations to the precise form disclosed. Modifications and variations are possible in light of the above disclosure or may be acquired from practice of the implementations.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

I claim:
1. A waste management and sorting system comprising:
   a server device having a memory and one or more processors, the memory having a database;
   a smart waste machine comprising:
      a housing;

a selectively openable hatch on the exterior of the housing;

an internal mechanism configured to prepare and move storage containers;

a user identification device on the exterior of the housing;

a first computer communicatively coupled to the user identification device and the server device, the computer having a user facing interface, a memory, and one or more processors configured to:

identify a user;

collect waste type data from the user corresponding to a waste to be disposed;

determine and prepare a storage container configured to contain the waste, the storage container having a first identifier associated with the storage container;

open the hatch allowing for the user to insert the waste into the storage container;

close the hatch;

close the storage container once the waste is in the storage container;

move the closed storage container; and, send a plurality of data corresponding to the first identifier to the server device so that the server device updates the database to reflect the disposal of the waste;

a conveyor system comprising:

a first identifier sensor configured to capture first identifier data associated with the first identifier of a received storage container;

one or more conveyor belts configured to move waste removed from a waste storage container;

one or more optical sensors configured to capture a plurality of waste data associated with the waste; and, a second computer having a memory and one or more processors, the processors being communicatively coupled to the server device, the identification sensor, the one or more conveyor belts, and the one or more optical sensors and configured to:

determine the type of waste in a storage container based on captured first identifier data;

once the waste is removed from the storage container and selectively placed on the proper conveyor belt:

detect wrongly sorted waste based on captured waste data;

in response to detecting wrongly sorted waste:

remove the wrongly sorted waste and/or signal human workers to remove the wrongly sorted waste; and, send a plurality of data corresponding to the wrongly sorted waste to the server device so that the server device updates the database to reflect the user's disposal of wrongly sorted waste;

wherein the first identifier is a near-field communication ("NFC") chip, radio frequency identification ("RFID") chip, quick response ("QR") code, or barcode.

2. The waste management and sorting system of claim 1, wherein the detection of wrongly sorted waste results in an accrual of a surcharge payment associated with the user that disposed of the wrongly sorted waste that is reflected in the database.

3. The waste management and sorting system of claim 1, further comprising one or more video cameras configured to capture and store visual data associated with the waste as it travels on the conveyor belt.

4. The waste management and sorting system of claim 1, wherein the detection of wrongly sorted waste, removal of wrongly sorted waste, and the sending of data corresponding to the detection of wrongly sorted waste is performed by human workers.

5. The waste management and sorting system of claim 1, wherein the waste type data and the user identity data are collected through a user device communicatively coupled to the server device and/or the first computer of the conveyor system.

6. The waste management and sorting system of claim 1, wherein the plurality of data corresponding to the first identifier includes data corresponding to a payment for the disposal of the waste.

7. A waste management and sorting system comprising:

a housing;

a selectively openable hatch on the exterior of the housing;

an internal mechanism configured to prepare and move storage containers;

a user identification device on the exterior of the housing; and, a first computer communicatively coupled to the user identification device and the server device, the computer having a user facing interface, a memory, and one or more processors configured to:

identify a user;

collect waste type data from the user corresponding to a waste to be disposed;

determine and prepare a storage container configured to contain the waste, the storage container having a first identifier associated with the storage container;

open the hatch allowing for the user to insert the waste into the storage container;

close the hatch;

close the storage container once the waste is in the storage container;

move the closed storage container; and, send a plurality of data corresponding to the first identifier to the server device so that the server device updates the database to reflect the disposal of the waste;

a first identifier sensor configured to capture first identifier data associated with the first identifier of a received storage container;

one or more conveyor belts configured to move waste removed from a waste storage container;

one or more optical sensors configured to capture a plurality of waste data associated with the waste; and, a second computer having a memory and one or more processors, the processors being communicatively coupled to the server device, the identification sensor, the one or more conveyor belts, and the one or more optical sensors and configured to:

determine the type of waste in a storage container based on captured first identifier data;

once the waste is removed from the storage container and selectively placed on the proper conveyor belt:

detect wrongly sorted waste based on captured waste data;

in response to detecting wrongly sorted waste:

remove the wrongly sorted waste and/or signal human workers to remove the wrongly sorted waste; and, send a plurality of data corresponding to the wrongly sorted waste to the server device so that the server device updates the database to reflect the user's disposal of wrongly sorted waste.

8. The waste management and sorting system of claim 7, further comprising one or more video cameras configured to capture and store visual data associated with waste on the conveyor belt.

9. The waste management and sorting system of claim 7, further comprising a user device communicatively coupled to the server device and/or the smart waste machine wherein the plurality of data associated with the waste type and the identity of the user are collected through the user device.

* * * * *